United States Patent [19]

Sato

[11] Patent Number: 5,245,484
[45] Date of Patent: Sep. 14, 1993

[54] DPSK-DEMODULATING APPARATUS

[75] Inventor: Koichi Sato, Tokyo, Japan

[73] Assignee: Asahi Kogaku Kogyo Kabushiki Kaisha, Tokyo, Japan

[21] Appl. No.: 963,020

[22] Filed: Oct. 19, 1992

Related U.S. Application Data

[63] Continuation of Ser. No. 498,626, Mar. 26, 1990, abandoned.

[30] Foreign Application Priority Data

Mar. 28, 1989 [JP] Japan .................. 1-76324

[51] Int. Cl.[5] .............................. G11B 5/09
[52] U.S. Cl. ............................ 360/40; 360/18
[58] Field of Search ............ 360/40, 41, 42, 48, 360/18, 19.1

[56] References Cited

U.S. PATENT DOCUMENTS

| | | | |
|---|---|---|---|
| 3,924,186 | 12/1975 | Gordy et al. | 325/30 |
| 4,454,499 | 6/1984 | Yarborough, Jr. | 360/41 |
| 4,628,271 | 12/1986 | Takayama | 329/50 |
| 4,651,108 | 3/1987 | Okita et al. | 329/110 |
| 4,827,357 | 5/1989 | Kawakami | 358/310 |
| 4,970,582 | 11/1990 | Scott | 360/41 |

FOREIGN PATENT DOCUMENTS

| | | |
|---|---|---|
| 58-129864 | 10/1983 | Japan . |
| 62-223855 | 10/1987 | Japan . |
| 62-224145 | 10/1987 | Japan . |
| 63-2446 | 1/1988 | Japan . |
| 62-276987 | 5/1988 | Japan . |
| 1560107 | 1/1980 | United Kingdom . |
| 2139438 | 11/1984 | United Kingdom . |

OTHER PUBLICATIONS

Kaden, H.: Impulse Und Schaltvorgange In Der Nachrichtentechnik, Munchen, Oldenbourg-Verland 1957, pp. 174–182.
English Abstract to Japanese Publication 62-223855.
English Abstract to Japanese Publication 62-224145.
English Abstract to Japanese Publication 63-2446.

Primary Examiner—A. J. Heinz
Attorney, Agent, or Firm—Sandler Greenblum & Bernstein

[57] ABSTRACT

A data signal reproducing apparatus has an envelope detector for detecting a DPSK-modulated data signal, a change point detector for detecting a point of change of the detected envelope, and a latch for inverting and holding an output signal every time the change point detector detects a point of change of the envelope. An electronic still camera incorporating the data signal reproducing apparatus has a magnetic head that reads a picture signal and a DPSK-modulated data signal which have been recorded on a recording medium in the form of a multiplex recording signal. An extracting device extracts the DPSK-modulated data signal from the multiplex recording signal read by the magnetic head.

16 Claims, 3 Drawing Sheets

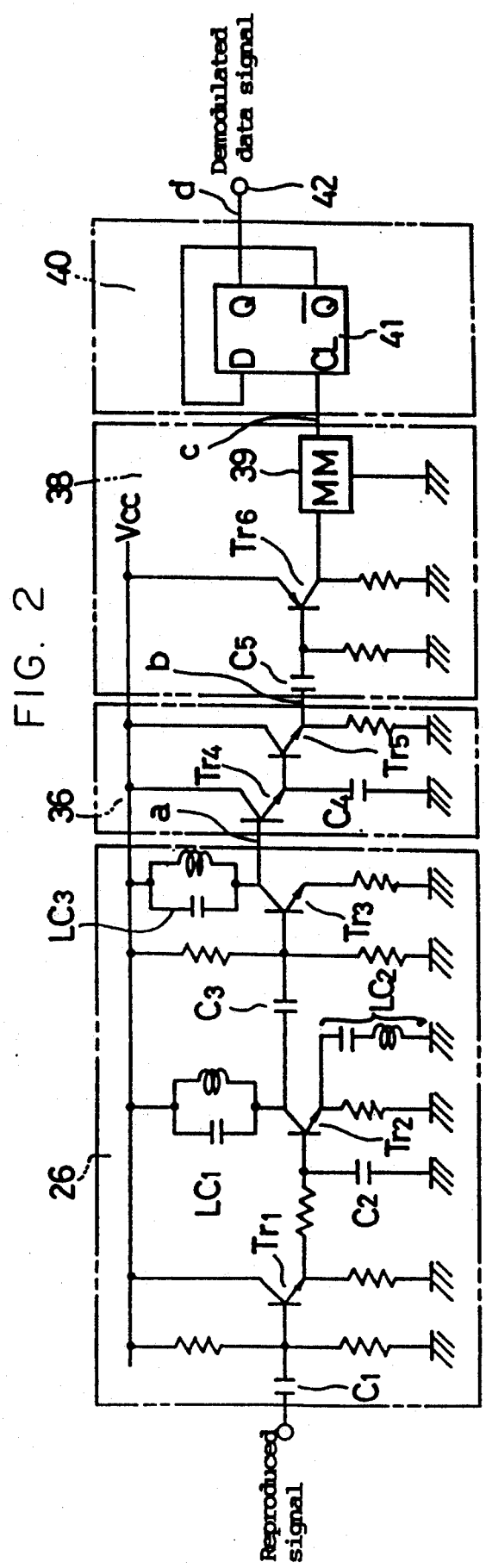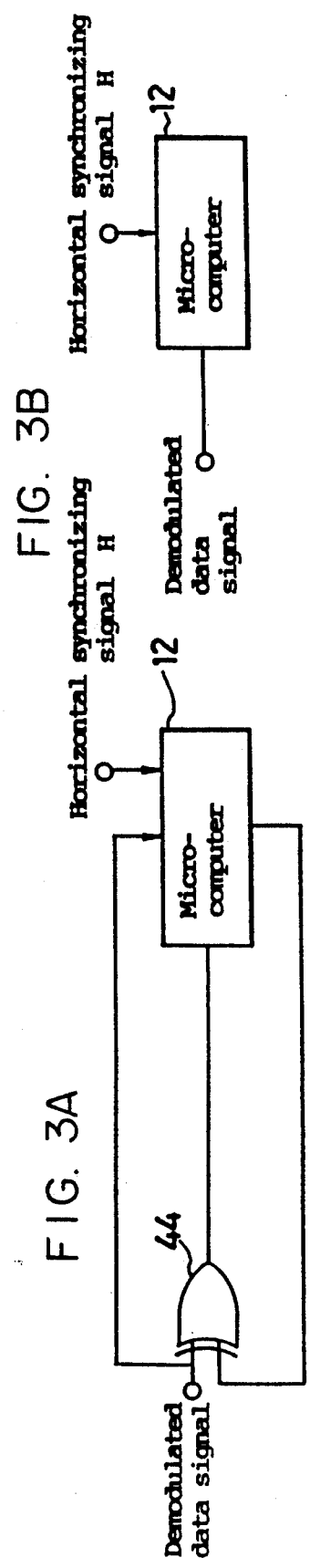

DPSK-DEMODULATING APPARATUS

This application is a continuation, of application Ser. No. 07/498,626, filed Mar. 26, 1990, now abandoned.

BACKGROUND OF THE INVENTION

1. Field of the Invention

The present invention relates to a still video camera and, more particularly, to an apparatus for reproducing data signals recorded with a picture signal in the form of a multiplex recording signal.

2. Description of Related Art

A typical conventional still video camera has heretofore been arranged such that the image of an object is photoelectrically converted by means of an image pickup device to capture the object image in the form of a luminance signal (Y) and a color signal (C). These signals are frequency modulated together and recorded on a magnetic disc in the form of a multiplex picture signal. According to a recent unified standard for still video cameras, a data signal which indicates whether a particular record is a field record or frame record and which also carries other information, for example, the ordinal number of a track on which a particular record has been stored, is recorded on a magnetic disc while being superposed upon the above-described picture signal by a frequency multiplexing method.

To modulate the data signal, DPSK (Differential Phase Shift Keying) modulation is adopted. Accordingly, the data signal is subjected to DPSK modulation and recorded on a magnetic disc while being superposed upon the picture signal. To reproduce the recorded data, the data signal is extracted from the frequency-modulated signal that is read out from the magnetic disc and subjected to DPSK demodulation, after waveform shaping. Various apparatuses for reproducing the data signal have been developed [for example, Japanese Patent Application Laid-Open (KOKAI) No. 62-223855 (1987)].

However, conventional data signal reproducing circuits have a complicated circuit configuration, and the scale of the circuit is large. Accordingly, the production cost is high, and the circuit control is complicated.

SUMMARY OF THE INVENTION

In view of the above-described problems of the conventional data reproducing apparatus, it is an object of the present invention to provide a data reproducing apparatus having a simplified circuit configuration.

The present invention, which was made by noting that the phase of a DPSK carrier wave changes when the state of a non-carrier wave changes, comprises an envelope detecting means for detecting a DPSK-modulated data signal, a change point detecting means for detecting a point of change of the detected envelope, and a latch means for inverting and holding the output signal every time the change point detecting means detects a point of change of the envelope.

By virtue of the above-described arrangement, the data signal is demodulated by the envelope detecting means change point detecting means resulting in a simplified circuit configuration.

In addition, it is possible to reproduce each bit of the data signal by providing the latch means that inverts and holds the output signal every time the change point detecting means detects a point of change of the envelope.

According to another aspect of the present invention, there is provided means for reading a picture signal and a DPSK-modulated data signal which have been recorded on a recording medium in the form of a multiplex recording signal, a data signal extracting means for extracting the DPSK-modulated data signal from the multiplex recording signal read by the read means, an envelope detecting means for detecting the DPSK-modulated data signal outputted from the data signal extracting means, a change point detecting means for detecting a point of change of the detected envelope, and a latch means for inverting and holding the output signal every time the change point detecting means detects a point of change of the envelope.

BRIEF DESCRIPTION OF THE DRAWINGS

FIG. 2 is a diagram showing specific circuits of a data signal tuned amplifier, envelope detecting circuit, change point detecting circuit and flip-flop of the embodiment shown in FIG. 1;

FIGS. 3A and 3B are circuit diagrams showing a portion where the demodulated data signal is inputted to a microcomputer; and FIGS. 4(A)-4(D1,2) are timing charts regarding various circuits used in the embodiment of FIG. 1.

DESCRIPTION OF PREFERRED EMBODIMENTS

Figure 1:
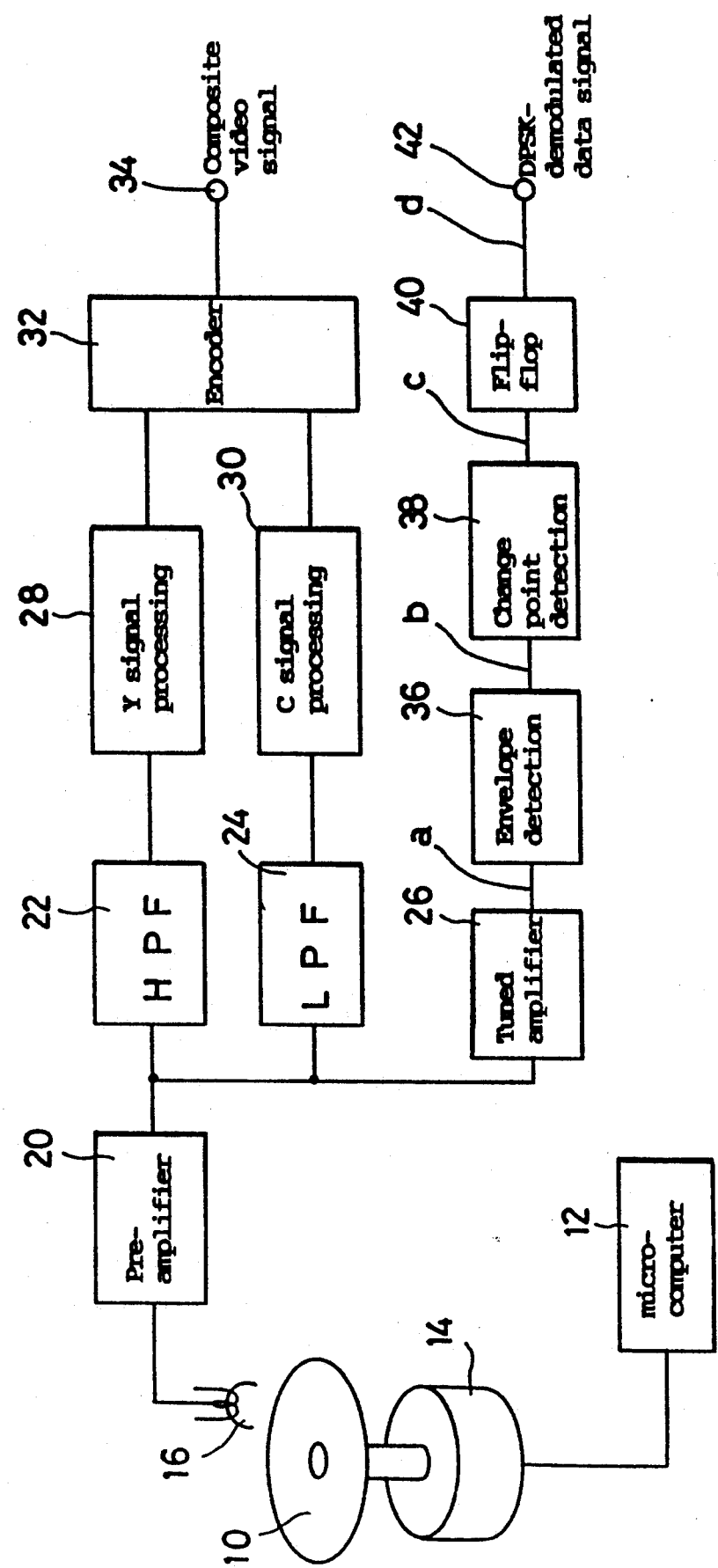
FIG. 1 is a block diagram schematically showing a still video reproducing apparatus to which the data signal reproducing apparatus of the present invention is applied.

The present invention will be described below by way an embodiment illustrated in the drawings. FIG. 1 is a block diagram showing a circuit configuration of a still video reproducing apparatus to which the present invention is applied.

A magnetic disc 10 has, as is generally known, a picture signal comprising a luminance signal and a chrominance(color) signal, together with a data signal, recorded thereon in the form of a multiplex recording signal. The luminance and chrominance signals are frequency-modulated in high and low frequency bands, respectively, and the data signal is DPSK-modulated in a frequency band which is lower than that for the chrominance signal.

The magnetic disc 10, which serves as a recording medium, is rotated by a servomotor 14 which is controlled by a microcomputer 12. The multiplex signal recorded on the magnetic disc 10 is read by a magnetic head 16, which serves as a read means. It should be noted that the magnetic head 16 is moved so as to follow a given track by the action of a head tracking mechanism (not shown) which is controlled by the microcomputer 12.

The multiplex recording signal that is read by the magnetic head 16 is amplified by a pre-amplifier 20 and inputted to a high-pass filter (HPF) 22, a low-pass filter (LPF) 24 and a data signal tuned amplifier 26, which serves as a data signal extracting means. The high-pass filter 22 passes only signals in the high-frequency band which are related to the luminance signal. The low-pass filter 24 passes only signals in the low-frequency band which are related to the chrominance signal, and the data signal tuned amplifier 26 amplifies and passes only the data signal carrier wave.

The luminance signal, having passed through the high-pass filter 22 is subjected to a predetermined processing in a luminance signal processing circuit 28 and inputted to an encoder 32. Similarly, the chrominance signal having passed through the low-pass filter 24 is subjected to a predetermined processing in a chrominance signal processing circuit 30 and inputted to the encoder 32. The encoder 32 demodulates frequency-modulated luminance and chrominance signals and outputs them to a video terminal 34 in the form of a composite picture signal (video signal).

The DPSK-modulated signal tuned amplifier 26 extracts and amplifies only the DPSK-modulated signal and outputs it to an envelope detecting circuit 36. It should be noted that the data signal read from the magnetic disc 10 is synchronous with horizontal synchronizing signal H. More specifically, the following pieces of information have been synchronously recorded: a 1-bit initial bit which is assigned 4H from 28H; 2-bit information indicating whether a particular record is a field record or a frame record, which is assigned 8H from 32H; and 7-bit track number information which is assigned 28H from 40H.

The DPSK-modulated signal that is extracted and amplified in the data signal tuned amplifier 26 is subjected to envelope detection in the envelope detecting circuit 36. The enveloped signal is then inputted to a change point detecting circuit 38.

The change point detecting circuit 38 detects a point (valley) of change of the envelope and shapes it into a pulse signal which is inputted it to a flip-flop 40, which serves as a latch means.

Every time the flip-flop 40 receives a pulse signal, it inverts the output level to form a DPSK-demodulated data signal which is then forwarded to a data signal output terminal 42.

FIG. 2 shows specific circuit configurations of the DPSK-modulated signal tuned amplifier 26, the envelope detecting circuit 36, the change point detecting circuit 38 and the flip-flop 40.

The multiplex signal that is inputted to the DPSK-modulated signal tuned amplifier 26 passes through a capacitor C1 where the DC component is removed, and then passes through the base of a transistor Tr1. Thereafter, only the data signal (DPSK carrier wave) is amplified in a parallel resonant circuit LC1 connected to the collector of a second-stage transistor Tr2 and a series resonant circuit LC2 that is connected to the emitter of transistor Tr2. After the DC component has been removed by capacitor C3, the data signal is subjected to band limited amplification by a transistor Tr3 having a parallel resonant circuit LC3 connected to its collector and outputted to the envelope detecting circuit 36.

Figure 4:
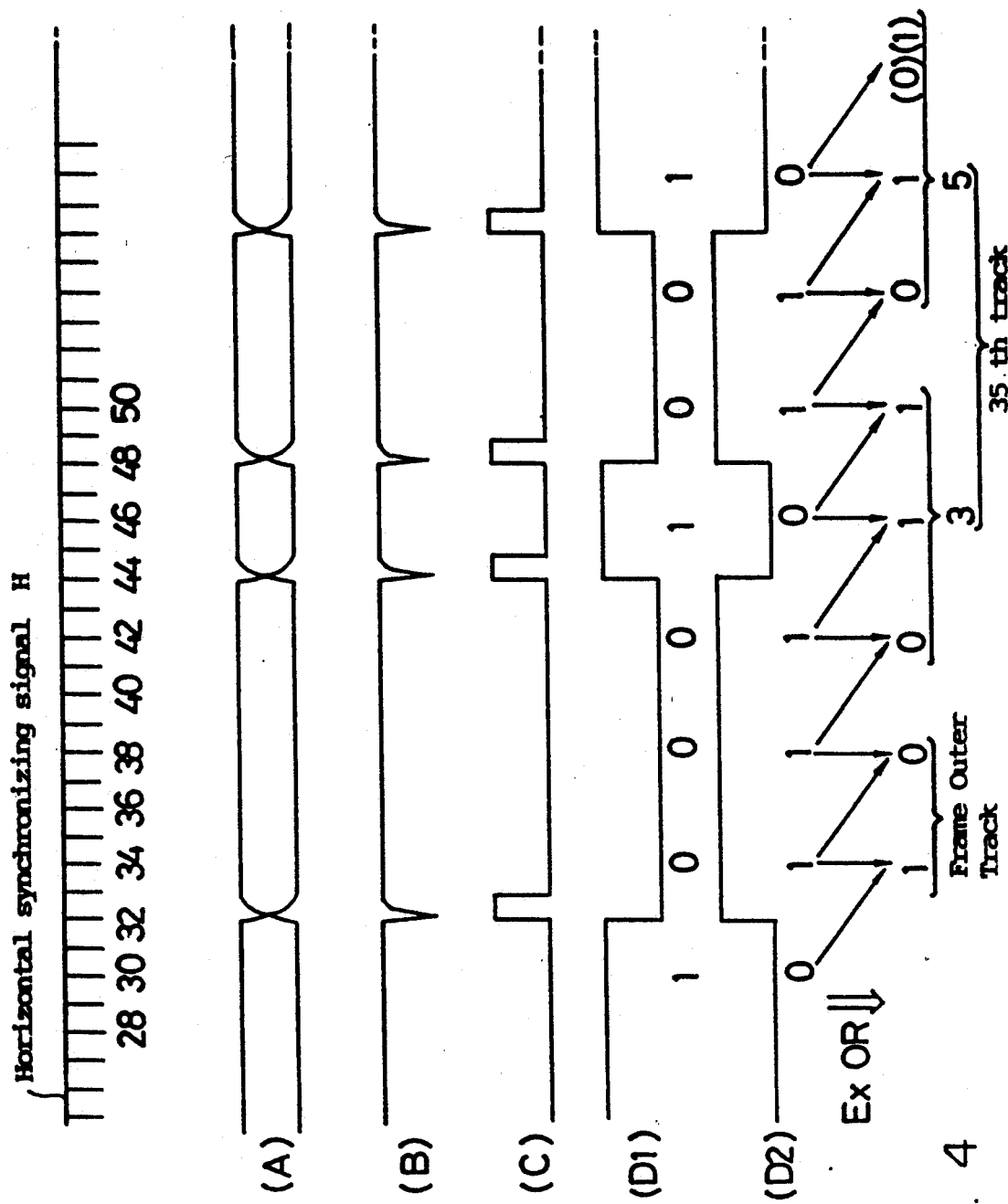

FIG. 4(A) shows the output waveform of the DPSK-modulated signal tuned amplifier 26.

The data signal that is inputted to the envelope detecting circuit 36 is subjected to envelope detection by transistors Tr4 and Tr5, the emitter of transistor Tr4 being grounded through a capacitor C4, and then inputted to the change point detecting circuit 38. FIG. 4(B) shows the output waveform of the envelope detecting circuit 36. More specifically, a portion of the carrier wave which represents the same data signal bit has a fixed amplitude and therefore shows a fixed potential, whereas, a portion of the carrier wave where the frequency changes, that is, a boundary portion where the data signal bit is inverted, shows a potential changing in the shape of a V.

After the DC component has been removed by capacitor C5 in the change point detecting circuit 38, the enveloped data signal is amplified by transistor Tr6 and then inputted to a monostable multivibrator (MM) 39. Since the monostable multivibrator 39 outputs an "H" pulse every time the input rises, the data signal is shaped into a pulse signal wave in which each V portion is shaped into a rectangular wave, as shown in FIG. 4(C). The data signal thus shaped is inputted to the flip-flop 40.

The flip-flop 40 comprises a D flip-flop 41 in which the above-described enveloped pulse signal is inputted to input CL. The output $\overline{Q}$ of D flip-flop 41 is fed back to input D, while output Q is delivered to the data signal output terminal 42. Accordingly, every time an "H" pulse is inputted to input CL, the level of output Q is inverted and output Q is latched at the inverted level, resulting in the waveform shown in FIG. 4(D1) or 4 (D2).

The output from the data signal output terminal 42, that is, output Q of the D flip-flop 41, is read bitwise by the microcomputer 12 through a logical circuit, for example, an exclusive-OR gate 44 shown in FIG. 3A. One input terminal of the exclusive-OR gate 44 is supplied with the output Q of the flip-flop 40, while the other input terminal of the gate 44 is supplied with output Q of the exclusive-OR gate 44 a predetermined time (corresponding to 4H of the horizontal synchronizing signal) before, which is outputted from the microcomputer 12 at a predetermined time based on the horizontal synchronizing signal, thereby reproducing the data signal on a bitwise basis.

The reproduced data signal that is outputted from the exclusive-OR gate 44 is decoded in the microcomputer 12 and stored therein, as well as being subjected to a predetermined processing. In this embodiment, the field/frame information bits are "10" and the track number bits are "01101(01)". The data signal is therefore decoded as being a frame recorded the outer 35th track. Then, the track number "35" is displayed on a given display.

It should be noted that the arrangement may be such that the exclusive-OR gate 44 is not provided, but exclusive-ORing is instead executed in the microcomputer 12, as shown in FIG. 3B.

According to the foregoing embodiment, it is possible to demodulate a data signal by detecting changes of the data signal bits by use of the data signal carrier envelope detecting circuit and the change point detecting circuit. Accordingly, the arrangement of the data signal reproducing circuit is simplified.

Although the present invention has been described above on the basis of the embodiment illustrated in the drawings, it should be noted that the present invention is not necessarily limited to the described embodiment and that the essential thing is to provide a circuit configuration which enables envelope detection of a modulated data signal and detection of a point of change of the envelope resulting from the envelope detection.

In addition, the data reproducing apparatus of the present invention may also be applied to still video cameras having reproducing equipment.

As will be clear from the foregoing description, the data signal reproducing apparatus of the present invention is capable of demodulating a data signal by envelope-detecting the carrier wave of the DPSK-modulated data signal and detecting a point of change of the detected envelope. It is therefore possible to simplify the circuit configuration, and hence reduce the size of the circuit and lower the production cost.

I claim:

1. A DPSK-demodulating apparatus for reproducing a data signal from a DPSK-modulated signal, said apparatus comprising:
envelope detecting means for detecting an envelope of said DPSK-modulated signal;
means for detecting a point of change of said envelope detected by said envelope detecting means, said detected point of change being shaped into a pulse signal; and
means for inverting and holding an output signal every time said change point detecting means outputs said shaped pulse signal.

2. A DPSK-demodulating apparatus for reproducing a data signal from a DPSK-modulated signal, comprising:
envelope detecting means for detecting an envelope of said DPSK-modulated signal;
means for detecting a point of change of said detected envelope; and
means for inverting and holding an output signal every time said change point detecting means detects a point of change of said envelope, wherein said change point detecting means includes a monostable multivibrator which outputs a pulse when a phase of said envelope changes.

3. A data signal reproducing apparatus according to claim 2, wherein said latch means includes a flip-flop circuit which reverses and holds said output signal when said monostable multivibrator outputs said pulse.

4. A data signal reproducing apparatus according to claim 1, wherein said change point detecting means detects a point of change in phase of said envelope.

5. A data signal reproducing apparatus according to claim 4, wherein said change point detecting means outputs a pulse every time a point of change in phase is detected.

6. A data signal reproducing apparatus according to claim 4, wherein said output signal comprises a bi-level signal which is switched from a first level to a second level in response to detection, by said change point detecting means, of a point of change in phase.

7. A data signal reproducing apparatus according to claim 6, wherein said first level is a high level and said second level is a low level, and said bi-level signal is a binary signal which is coded in DPSK.

8. A data signal reproducing apparatus according to claim 1, wherein said apparatus further comprises a tuned amplifier for band-limiting said DPSK-modulated signal before processing by said envelope detecting means.

9. A DPSK-demodulating apparatus for reproducing a data signal from a DPSK-modulated signal, said apparatus comprising:
means for reading a multiplex recording signal including said DPSK-modulated signal, said multiplex recording signal being recorded on a recording medium;
means for extracting said DPSK-modulated signal from said multiplex recording signal read by said reading means;
envelope detecting means for detecting an envelope of said DPSK-modulated signal extracted from said multiplex recording signal;
means for detecting a point of change of said envelope detected by said envelope detecting means, said detected point of change being shaped into a pulse signal; and
latch means for inverting and holding an output signal every time said change point detecting means outputs said shaped pulse signal, thereby demodulating said DPSK-modulated signal.

10. A data signal reproducing apparatus according to claim 9, wherein said recording medium comprises a magnetic disc.

11. A data signal reproducing apparatus according to claim 10, wherein said reading means comprises a magnetic head.

12. A data signal reproducing apparatus according to claim 9, wherein said data signal extracting means comprises a data signal tuned amplifier.

13. A DPSK-demodulating apparatus according to claim 9, wherein said extracting means comprises a DPSK tuned amplifier for extracting and amplifying only said DPSK-modulated signal.

14. A still video apparatus for reproducing a data signal recorded together with a picture signal in the form of a multiplex recording signal, said apparatus comprising:
a DPSK-demodulating device for reproducing a data signal from a DPSK-modulated signal; and
picture signal recording means for recording a picture signal;
said device comprising:
envelope detecting means for detecting an envelope of said DPSK-modulated signal;
means for detecting a point of change of said envelope detected by said envelope detecting means, said detected point of change being shaped into a pulse signal; and
means for inverting and holding an output signal every time said change point detecting means outputs said shaped pulse signal.

15. A DPSK-demodulating apparatus for reproducing a data signal from a DPSK-modulated signal, comprising:
means for reading a multiplex recording signal including said DPSK-modulated signal, said multiplex recording signal being recorded on a recording medium;
means for extracting said DPSK-modulated signal from said multiplex recording signal read by said reading means;
envelope detecting means for detecting an envelope of said DPSK-modulated signal extracted from said multiplex recording signal;
means for detecting a point of change of said detected envelope; and
latch means for inverting and holding an output signal every time said change point detecting means detects a point of change of said envelope, thereby demodulating said DPSK-modulated signal, wherein said change point detecting means includes a monostable multivibrator which outputs a pulse when a phase of said envelope changes.

16. A data signal reproducing apparatus according to claim 15, wherein said latch means comprises a flip-flop circuit which reverses said output signal when said monostable multivibrator outputs said.

* * * * *

UNITED STATES PATENT AND TRADEMARK OFFICE
CERTIFICATE OF CORRECTION

PATENT NO. : 5,245,484
DATED : September 14,1993
INVENTOR(S) : K. SATO

It is certified that error appears in the above-indentified patent and that said Letters Patent is hereby corrected as shown below:

At column 6, line 65 (claim 16, line 4) of the printed patent, insert ---pulse--- after "said".

Signed and Sealed this

First Day of November, 1994

Attest:

BRUCE LEHMAN

Attesting Officer    Commissioner of Patents and Trademarks